(12) United States Patent
Kowalczyk et al.

(10) Patent No.: US 7,894,701 B2
(45) Date of Patent: Feb. 22, 2011

(54) FIBER OPTIC ENCLOSURE WITH INTERNAL CABLE SPOOL

(75) Inventors: Scott C. Kowalczyk, Savage, MN (US); Jonathan Walter Coan, Savage, MN (US); Jonathan Kaml, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/793,556

(22) Filed: Jun. 3, 2010

(65) Prior Publication Data

US 2010/0310224 A1    Dec. 9, 2010

Related U.S. Application Data

(63) Continuation of application No. 12/182,705, filed on Jul. 30, 2008, now Pat. No. 7,756,379.

(60) Provisional application No. 60/954,214, filed on Aug. 6, 2007, provisional application No. 61/029,248, filed on Feb. 15, 2008.

(51) Int. Cl.
*G02B 6/00* (2006.01)
(52) U.S. Cl. ...................... 385/139; 385/147
(58) Field of Classification Search ......... 385/135–139, 385/147
See application file for complete search history.

(56) References Cited

U.S. PATENT DOCUMENTS

| | | | |
|---|---|---|---|
| 1,276,825 A | 8/1918 | Swope | |
| 1,442,999 A | 1/1923 | Boardman et al. | |
| 1,446,410 A | 2/1923 | McCormick et al. | |
| 1,474,580 A | 11/1923 | Clark et al. | |
| RE20,995 E | 2/1939 | Beasley | |
| 2,502,496 A | 4/1950 | Wickman | |
| 2,521,226 A | 9/1950 | Keller | |
| 2,727,703 A | 12/1955 | Bonnett | |
| 3,131,729 A | 5/1964 | Rudolf | |

(Continued)

FOREIGN PATENT DOCUMENTS

DE    42 26 368 A1    2/1994

(Continued)

OTHER PUBLICATIONS

7 Inch Modules, ADC Telecommunications, Inc, © 1998, "7 Inch Connector Module with IFC", pp. 127.

(Continued)

*Primary Examiner*—Akm E Ullah
(74) *Attorney, Agent, or Firm*—Merchant & Gould P.C.

(57) ABSTRACT

A fiber optic enclosure assembly includes a housing having an interior region and a bearing mount disposed in the interior region of the housing. A cable spool is connectedly engaged with the bearing mount such that the cable spool selectively rotates within the housing. A termination module disposed on the cable spool so that the termination module rotates in unison with the cable spool. A method of paying out a fiber optic cable from a fiber optic enclosure includes rotating a cable spool, which has a subscriber cable coiled around a spooling portion of the cable spool, about an axis of a housing of the fiber optic enclosure until a desired length of subscriber cable is paid out. A termination module is disposed on the cable spool.

19 Claims, 14 Drawing Sheets

U.S. PATENT DOCUMENTS

| | | | |
|---|---|---|---|
| 3,657,491 A | 4/1972 | Ryder et al. | |
| 3,667,417 A | 6/1972 | Clinkenbeard | |
| 3,920,308 A | 11/1975 | Murray | |
| 3,940,086 A | 2/1976 | Stoqulet | |
| 4,053,118 A | 10/1977 | Aikins | |
| 4,081,258 A | 3/1978 | Goell et al. | |
| 4,384,688 A | 5/1983 | Smith | |
| 4,587,801 A | 5/1986 | Missout et al. | |
| 4,635,875 A | 1/1987 | Apple | |
| 4,666,237 A | 5/1987 | Mallinson | |
| 4,767,073 A | 8/1988 | Malzacher | |
| 4,869,437 A | 9/1989 | Berz et al. | |
| 4,883,337 A | 11/1989 | Dahlgren | |
| 4,913,369 A | 4/1990 | Lia et al. | |
| 4,939,798 A | 7/1990 | Last | |
| 4,940,859 A | 7/1990 | Peterson | |
| 5,016,554 A | 5/1991 | Harris et al. | |
| 5,066,256 A | 11/1991 | Ward | |
| 5,074,863 A | 12/1991 | Dines | |
| 5,185,843 A | 2/1993 | Aberson et al. | |
| 5,265,815 A | 11/1993 | Soyka et al. | |
| 5,280,861 A | 1/1994 | Corriveau | |
| 5,317,663 A | 5/1994 | Beard et al. | |
| 5,326,040 A * | 7/1994 | Kramer | 242/390.2 |
| 5,335,874 A | 8/1994 | Shrum et al. | |
| 5,494,234 A * | 2/1996 | Kramer | 242/390.2 |
| 5,494,446 A | 2/1996 | DeLucia et al. | |
| 5,497,444 A | 3/1996 | Wheeler | |
| 5,519,275 A | 5/1996 | Scott et al. | |
| 5,522,561 A | 6/1996 | Koyamatsu et al. | |
| 5,544,836 A | 8/1996 | Pera | |
| 5,551,545 A | 9/1996 | Gelfman | |
| 5,638,481 A | 6/1997 | Arnett | |
| 5,703,990 A | 12/1997 | Robertson et al. | |
| 5,709,347 A | 1/1998 | Hoffmann et al. | |
| 5,717,810 A | 2/1998 | Wheeler | |
| 5,718,397 A | 2/1998 | Stevens | |
| 5,749,148 A | 5/1998 | White et al. | |
| 5,787,219 A | 7/1998 | Muellet et al. | |
| 5,915,640 A | 6/1999 | Wagter et al. | |
| 5,987,203 A | 11/1999 | Abel et al. | |
| 5,992,787 A | 11/1999 | Burke | |
| 6,220,413 B1 | 4/2001 | Walters et al. | |
| 6,315,598 B1 | 11/2001 | Elliot et al. | |
| 6,494,396 B2 | 12/2002 | Sugata | |
| 6,522,826 B2 | 2/2003 | Gregory | |
| 6,554,221 B2 | 4/2003 | Hinds | |
| 6,591,051 B2 | 7/2003 | Solheid et al. | |
| 6,616,080 B1 | 9/2003 | Edwards et al. | |
| 6,669,129 B1 | 12/2003 | Shah | |
| 6,711,339 B2 | 3/2004 | Puetz et al. | |
| 6,834,517 B1 | 12/2004 | Sheehy, Jr. | |
| 6,856,748 B1 | 2/2005 | Elkins, II et al. | |
| 6,915,058 B2 | 7/2005 | Pons | |
| 6,937,725 B2 | 8/2005 | Liao | |
| 6,997,410 B1 | 2/2006 | Huang | |
| 7,000,863 B2 | 2/2006 | Bethea et al. | |
| 7,011,538 B2 | 3/2006 | Chang | |
| 7,016,590 B2 | 3/2006 | Tanaka et al. | |
| 7,017,721 B1 | 3/2006 | Bradford et al. | |
| 7,220,144 B1 | 5/2007 | Elliot et al. | |
| 7,315,681 B2 | 1/2008 | Kewitsch | |
| 7,346,253 B2 | 3/2008 | Bloodsworth et al. | |
| 7,364,108 B2 | 4/2008 | Kim et al. | |
| 7,369,739 B2 | 5/2008 | Kline et al. | |
| 7,397,997 B2 * | 7/2008 | Ferris et al. | 385/135 |
| 7,400,814 B1 | 7/2008 | Hendrickson et al. | |
| 7,477,829 B2 * | 1/2009 | Kaplan | 385/147 |
| 7,522,806 B2 | 4/2009 | Hendrickson et al. | |
| 7,546,018 B2 | 6/2009 | Hendrickson et al. | |
| 7,676,136 B2 * | 3/2010 | Wakileh et al. | 385/135 |
| 7,756,379 B2 | 7/2010 | Kowalczyk et al. | |
| 7,809,234 B2 * | 10/2010 | Smith et al. | 385/135 |
| 2001/0048044 A1 | 12/2001 | Sugata | |
| 2002/0003186 A1 * | 1/2002 | Hinds | 242/550 |
| 2002/0023814 A1 | 2/2002 | Poutiatine | |
| 2002/0126980 A1 * | 9/2002 | Holman et al. | 385/135 |
| 2002/0164121 A1 | 11/2002 | Brennan et al. | |
| 2002/0171002 A1 | 11/2002 | Krestsch et al. | |
| 2003/0037480 A1 | 2/2003 | Davis | |
| 2004/0170369 A1 | 9/2004 | Pons | |
| 2004/0244430 A1 | 12/2004 | Sheehy et al. | |
| 2005/0213920 A1 | 9/2005 | Tanaka et al. | |
| 2005/0247136 A1 | 11/2005 | Cross et al. | |
| 2005/0258411 A1 | 11/2005 | Zeitler | |
| 2006/0163403 A1 | 7/2006 | Dickson | |
| 2006/0183362 A1 | 8/2006 | Mullaney et al. | |
| 2006/0210230 A1 | 9/2006 | Kline et al. | |
| 2007/0025675 A1 | 2/2007 | Kramer | |
| 2007/0165995 A1 | 7/2007 | Reagan et al. | |
| 2008/0035778 A1 | 2/2008 | Belden et al. | |
| 2008/0037945 A1 | 2/2008 | Gniadek et al. | |
| 2008/0218947 A1 * | 9/2008 | Atkinson | 361/622 |
| 2008/0315030 A1 | 12/2008 | Hendrickson et al. | |
| 2009/0190894 A1 * | 7/2009 | Nhep et al. | 385/135 |
| 2010/0054680 A1 * | 3/2010 | Lochkovic et al. | 385/135 |
| 2010/0166376 A1 * | 7/2010 | Nair et al. | 385/135 |

FOREIGN PATENT DOCUMENTS

| | | |
|---|---|---|
| EP | 1 107 031 A1 | 6/2001 |
| FR | 2566997 | 1/1986 |
| JP | 9-236709 | 9/1997 |
| JP | 11-349230 | 12/1999 |
| JP | 2003114339 | 4/2003 |
| JP | 2005-73365 | 3/2005 |
| JP | 2005-249858 | 9/2005 |

OTHER PUBLICATIONS

Description of Admitted Prior Art, 30 pages.
F3DF Modules, ADC Telecommunications, Inc. © 1995, "Individual 12-Pack Assemblies", pp. 90.
Fiber Cable Management Products, Third Edition, ADC Telecommunications, Inc., © 1998.
Fiber Distribution Frame, Pre-Terminated Rear Load Connector Module, Installation Instructions, ADC Telecommunications, Inc., © 2000.
Fiber Main Distribution Frame (FMDF), Fiber Terminal Block, Installation Instructions, ADC Telecommunications, Inc., © 2001.
Fiber Panel Products—Cable Management Tray Panels, ADC Telecommunications, Inc., © 1994, 1996 "72 Fiber Distribution Module (FDM) with Intrafacility Fiber Cable", pp. 56.
Fiber Panel Products, Second Edition, ADC Telecommunications, Inc., © 1994, 1996.
FL2000 Products—Preconfigured Panels, ADC Telecommunications, Inc., © 2000 "Rack or Cabinet Mount Termination Panel with Multifiber Cable", pp. 13.
FL2000 Products, ADC Telecommunications, Inc., © 1994, 1996.
FL2000 Products, ADC Telecommunications, Inc., © 1994, 1996, "Rack Mount Panel with Intrafacility Fiber Cable", pp. 16.
IFC Style Frame Modules, ADC Telecommunications, Inc., © 1995, "Connector Module Equipped with IFC", pp. 27.
Next Generation Frame (NGF), Product Family Ordering Guide, ADC Telecommunications, Inc., © 1996, 1999, 2000 "Fiber Termination Blocks (FTB) Preterminated", pp. 8.
Next Generation Frame (NGF), Product Family Ordering Guide, ADC Telecommunications, Inc., © 1996, 1999, 2000.
Next Generation Frames—Fiber Termination Blocks, ADC Telecommunication, Inc., © 1998, "Fiber Termination Blocks (FTB) Preterminated" pp. 6.
Value-Added Module System, ADC Telecommunications, Inc., © 1993, 1194, 1998, "12-Pack Module Assemblies", pp. 30-31.

* cited by examiner

FIBER OPTIC ENCLOSURE WITH INTERNAL CABLE SPOOL

CROSS-REFERENCE TO RELATED APPLICATION

This application is a continuation of U.S. patent application Ser. No. 12/182,705, entitled "Fiber Optic Enclosure with Internal Cable Spool" and filed on Jul. 30, 2008, which claims the benefit of U.S. Provisional Patent Application Ser. Nos. 60/954,214, filed Aug. 6, 2007 and 61/029,248, filed on Feb. 15, 2008, all of which are hereby incorporated by reference in their entirety.

TECHNICAL FIELD

The present disclosure relates to fiber optic enclosure, and more particularly, to a fiber optic enclosure with cable payout.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure assembly for enclosing optical fiber connections. The fiber optic enclosure assembly includes a housing having an interior region and a bearing mount disposed in the interior region of the housing. A cable spool is connectedly engaged with the bearing mount such that the cable spool selectively rotates within the housing. A termination module is disposed on the cable spool so that the termination module rotates in unison with the cable spool.

Another aspect of the present disclosure relates to a method of paying out a fiber optic cable from a fiber optic enclosure. The method includes rotating a cable spool, which has a subscriber cable coiled around a spooling portion of the cable spool, about an axis of a housing of the fiber optic enclosure until a desired length of subscriber cable is paid out. The cable spool is disposed in an interior region of the fiber optic enclosure and a termination module is disposed on the cable spool.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
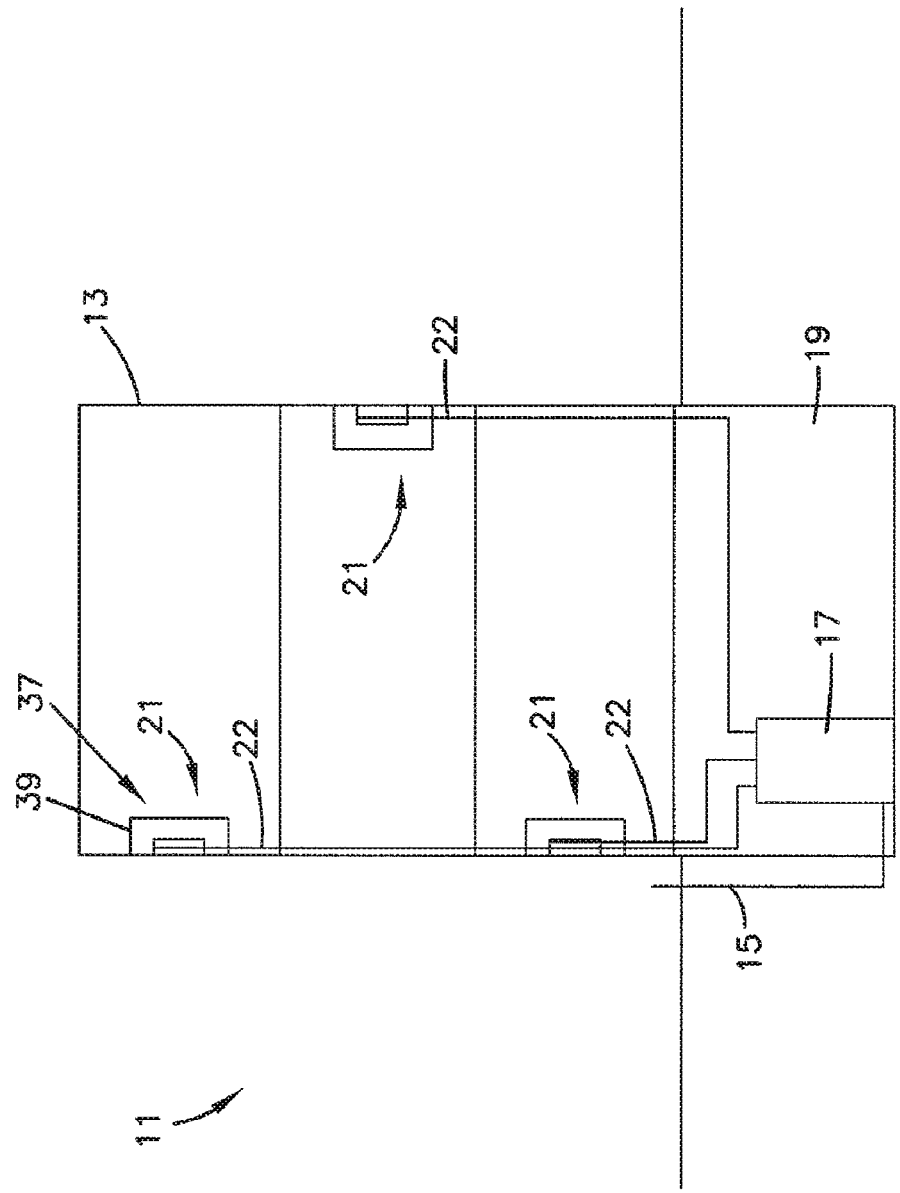
FIG. 1 is a schematic representation of a fiber optic network that includes a fiber optic enclosure having features that are examples of inventive aspects in accordance with the principles of the present disclosure.
Figure 2:
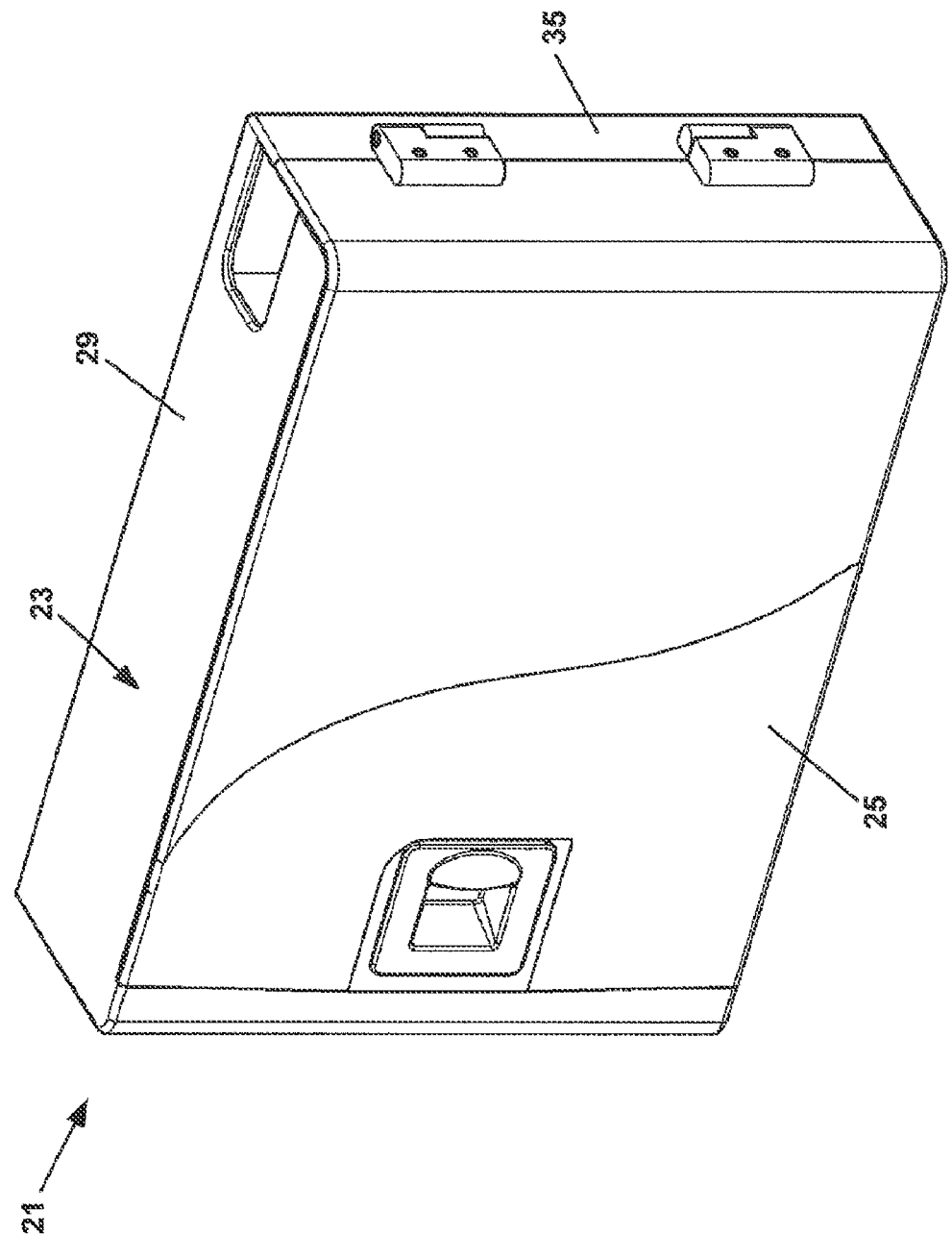
FIG. 2 is an isometric view of the fiber optic enclosure of FIG. 1.

Referring now to FIG. 1, a schematic representation of a fiber optic network, generally designated 11, in a facility 13 (e.g. individual residence, apartment, condominium, business, etc.) is shown. The fiber optic network 11 includes a feeder cable 15 from a central office (not shown). The feeder cable 15 enters a feeder cable input location 17 (e.g., a fiber distribution hub, a network interface device, etc.) having one or more optical splitters (e.g., 1-to-8 splitters, 1-to-16 splitters, or 1-to-32 splitters) that generate a number of individual fibers. In the subject embodiment, and by way of example only, the fiber distribution hub 17 is located on a lower level 19 of the facility 13. Each unit in the facility 13 includes a fiber optic enclosure, generally designated 21, with a subscriber cable 22 extending from each of the fiber optic enclosures 21 to the fiber distribution hub 17. The subscriber cable 22 extending between the fiber distribution hub 17 and the fiber optic enclosure 21 typically includes multiple optical fibers.

Referring now to FIGS. 2-5, the fiber optic enclosure 21 will now be described. The fiber optic enclosure 21 includes a housing, generally designated 23, having a cover 25.

The housing 23 includes a base 27, a first sidewall 29, and an oppositely disposed second sidewall 31. The first and second sidewalls 29, 31 extend outwardly from the base 27 such that the base 27 and the first and second sidewalls 29, 31 cooperatively define an interior region 33. In the subject embodiment, the cover 25 is hingedly engaged with a sidewall 35 that is connected to the base 27 and the first and second sidewalls 29, 31. It will be understood, however, that the scope of the present disclosure is not limited to the cover 25 being hingedly engaged the sidewall 35.

A cable spool, generally designated 37, is disposed in the interior region 33 of the fiber optic enclosure 21. The cable spool 37 includes a spooling portion 39, around which subscriber cable 22 is coiled (shown schematically in FIG. 1). The cable spool 37 further includes an axial end 41.

Figure 5:
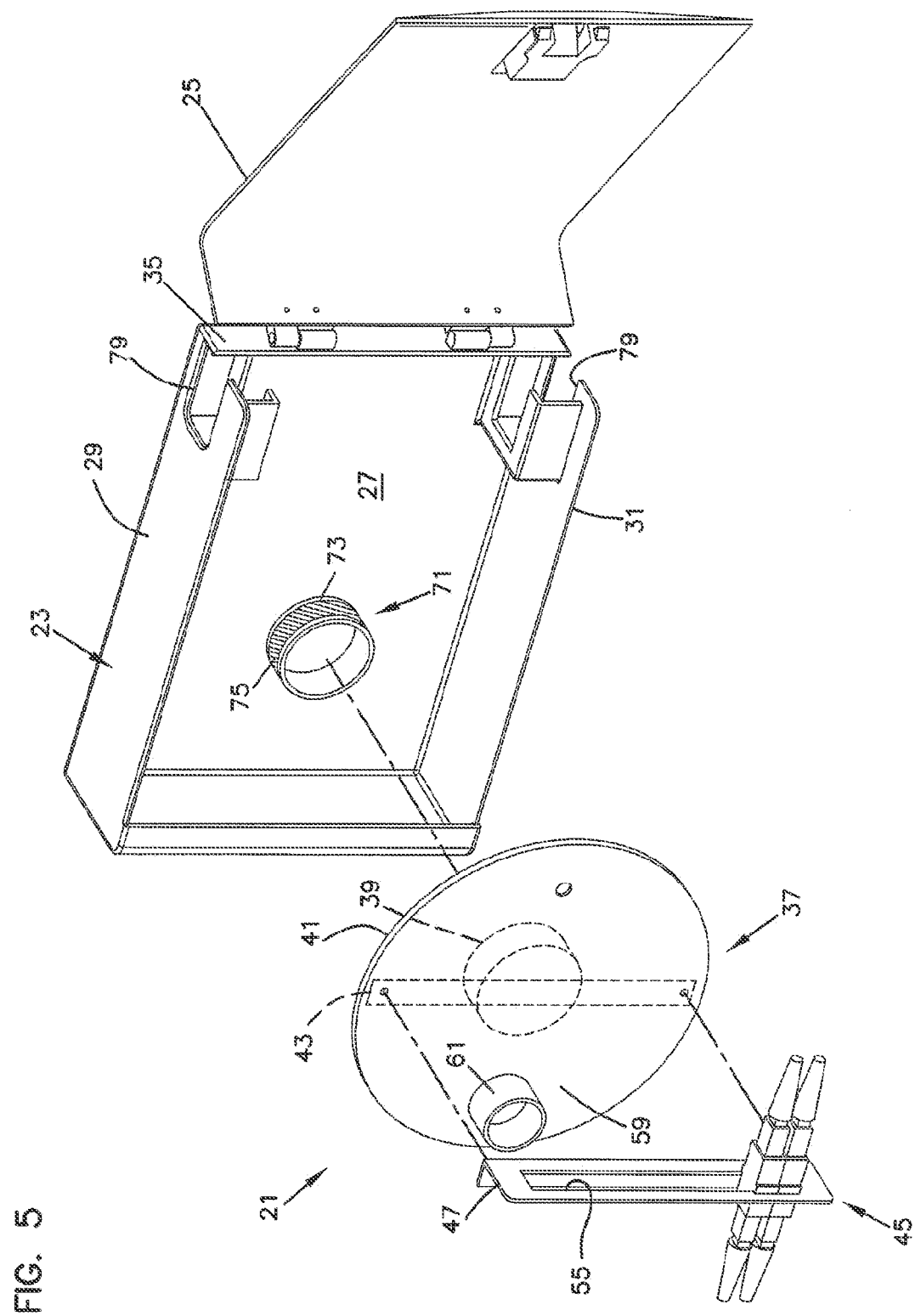
FIG. 5 is an exploded isometric view of the fiber optic enclosure of FIG. 2.

In the subject embodiment, the axial end 41 of the cable spool 37 defines a termination area 43 (shown as a dashed line in FIG. 5). Disposed in the termination area 43 is a termination module, generally designated 45. The termination module 45 of the fiber optic enclosure 21 serves as the dividing line between the incoming fibers and the outgoing fibers.

In the subject embodiment, the termination module 45 includes an adapter plate 47. The adapter plate 47 is an L-shaped bracket having a first side 49 (shown in FIG. 4) and a second side 51. The first side 49 defines a plurality of mounting holes 53 while the second side 51 defines an adapter slot 55. It will be understood, however, that the scope of the present disclosure is not limited to the adapter plate 47 being an L-shaped bracket. The first side 49 of the adapter plate 47 is rigidly mounted (i.e., non-rotatable) to the axial end 41 of the cable spool 37 through a plurality of fasteners 57 (e.g., bolts, screws, rivets, etc.) which are inserted through the mounting holes 53 in the first side 49 and in connected engagement with the axial end 41 of the cable spool 37.

The adapter slot 55 in the second side 51 of the adapter plate 47 is adapted to receive a plurality of adapters, generally designated 401. In the subject embodiment, the adapters 401 are SC-type adapters 401, although it will be understood that the scope of the present disclosure is not limited to the use of SC-type adapters 401. Similar SC-type adapters 401 have been described in detail in commonly owned U.S. Pat. No. 5,317,663, the disclosure of which is incorporated herein by reference.

Figure 6:
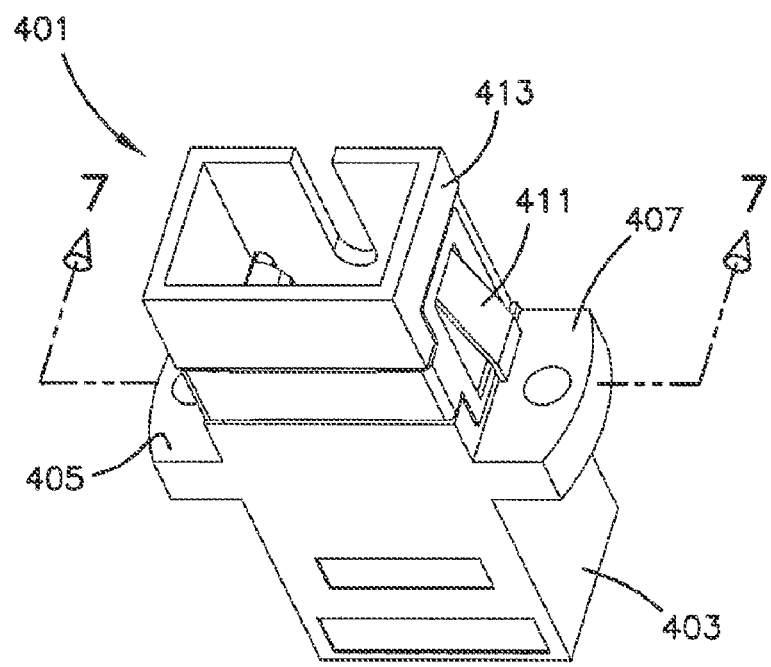
FIG. 6 is a perspective view of a fiber optic adapter suitable for use within the fiber optic enclosure of FIG. 2.
Figure 7:
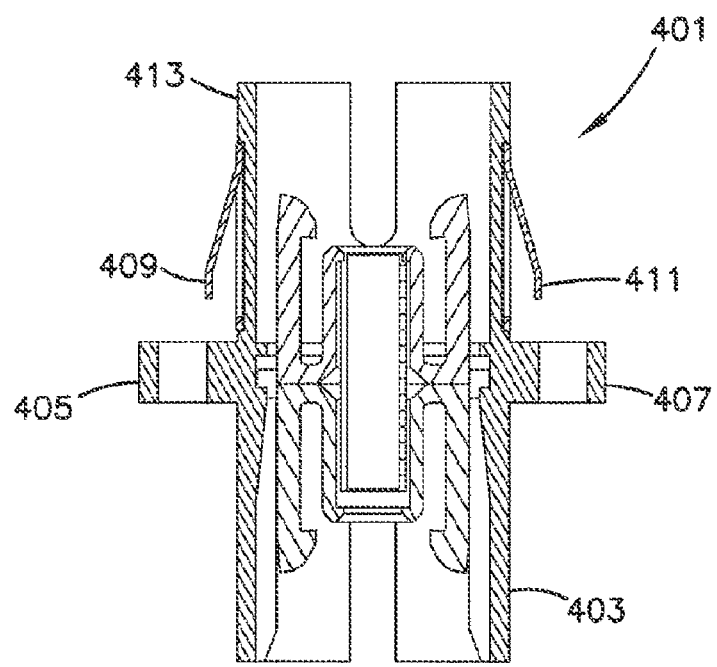
FIG. 7 is a cross-sectional view of the fiber optic adapter taken on line 7-7 of FIG. 6.
Figure 8:
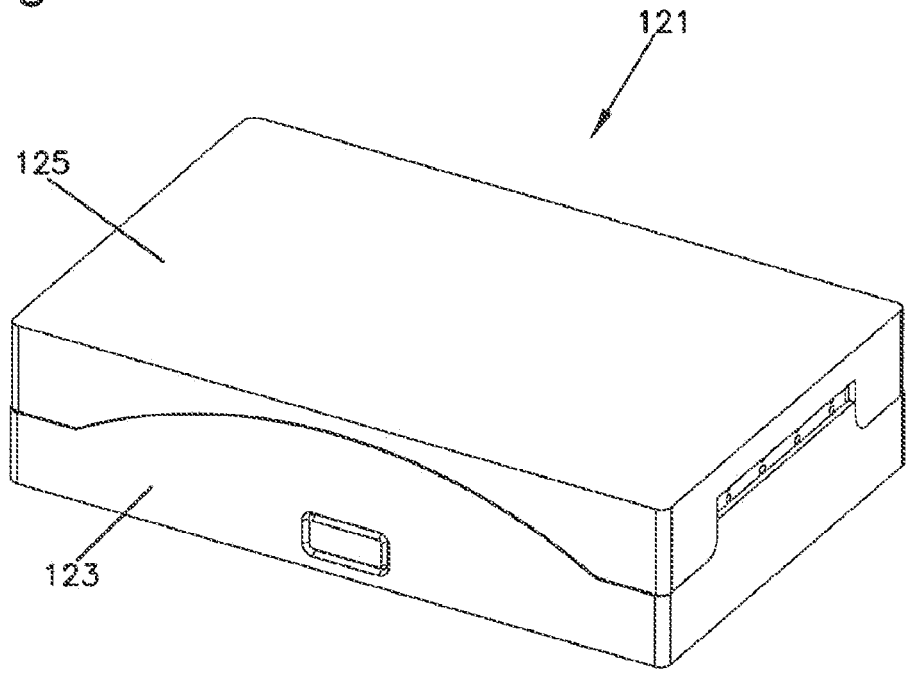
FIG. 8 is an isometric view of another embodiment of a fiber optic enclosure.
Figure 9:
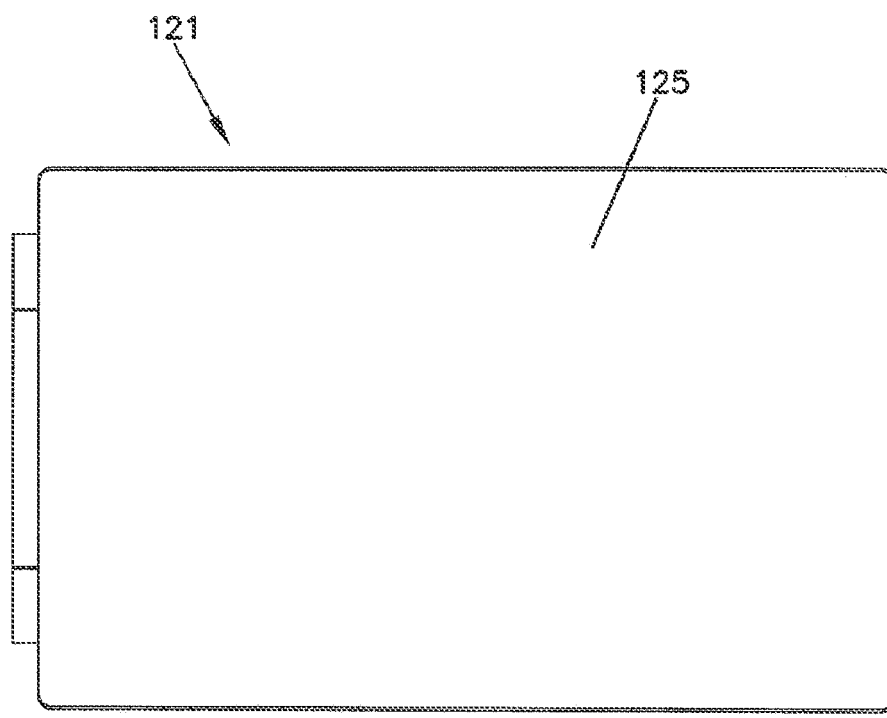
FIG. 9 is a front view of the fiber optic enclosure of FIG. 8.
Figure 10:
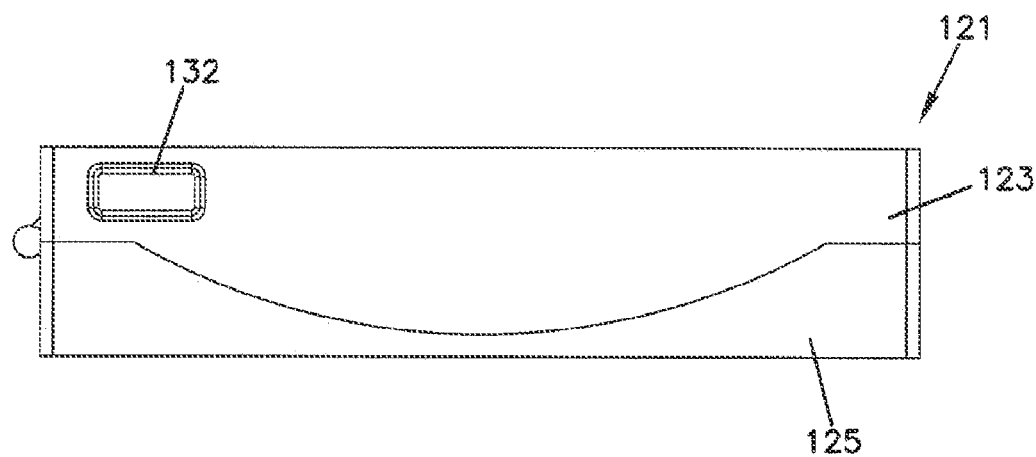
FIG. 10 is a top view of the fiber optic enclosure of FIG. 8.
Figure 11:
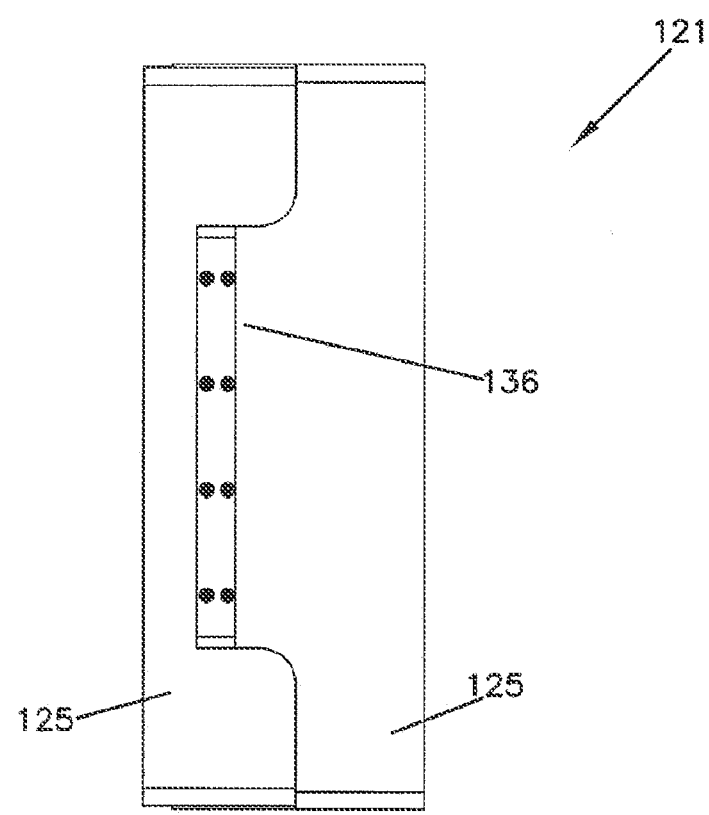
FIG. 11 is a side view of the fiber optic enclosure of FIG. 8.
Figure 12:
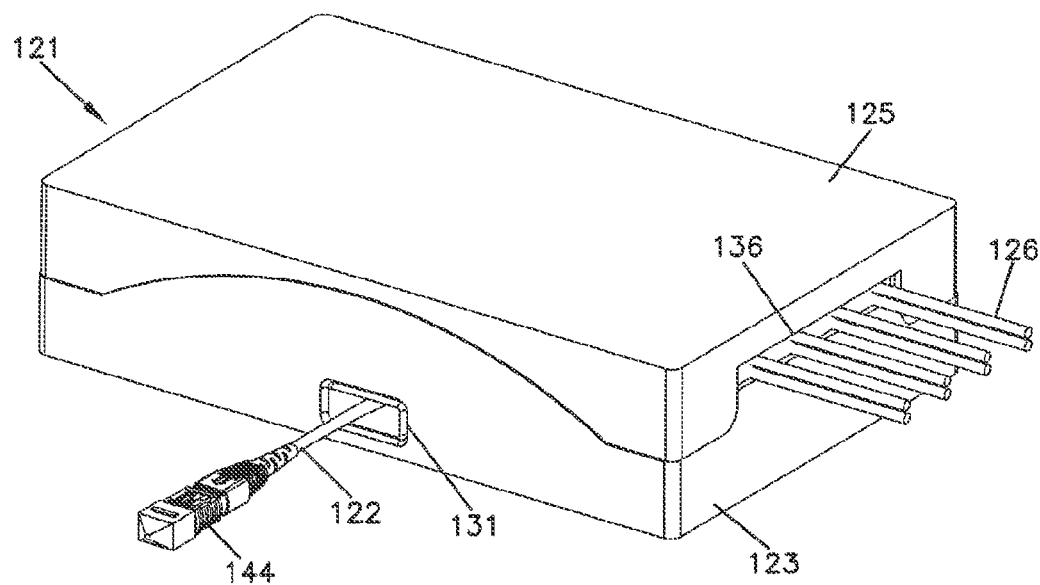
FIG. 12 is an isometric view of the fiber optic enclosure of FIG. 8, showing cables entering and exiting the enclosure.

Referring now to FIGS. 6 and 7, the SC-type adapter 401 includes a main body 403 with a pair of tabs 405, 407 located on the exterior of the main body 403. The tabs 405, 407 serve to support the adapter 401 in the adapter slot 55. The adapter 401 further includes a pair of retaining clips 409, 411, with one retaining clip 409, 411 associated with each tab 405, 407. A front side 413 of the adapter 401 is inserted into the adapter slot 55. As the adapter 401 is inserted through the adapter slot 55, the retaining clips 409, 411 compress against the main body 403. The adapter 401 is inserted into the adapter slot 55 until the tabs 405, 407 abut the adapter plate 47. With the tabs 405, 407 abutting the adapter plate 47, the retaining clips 409, 411 decompress on the opposite side of the adapter plate 47, thereby retaining the adapter plate 47 between the retaining clips 409, 411 and the tabs 405, 407.

In an alternate embodiment, the termination module includes a plurality of sliding adapter modules. Similar sliding adapter modules have been described in detail in commonly owned U.S. Pat. Nos. 5,497,444; 5,717,810, 6,591,051 and U.S. Pat. Pub. No. 2007/0025675, the disclosures of which are incorporated herein by reference.

Figure 3:
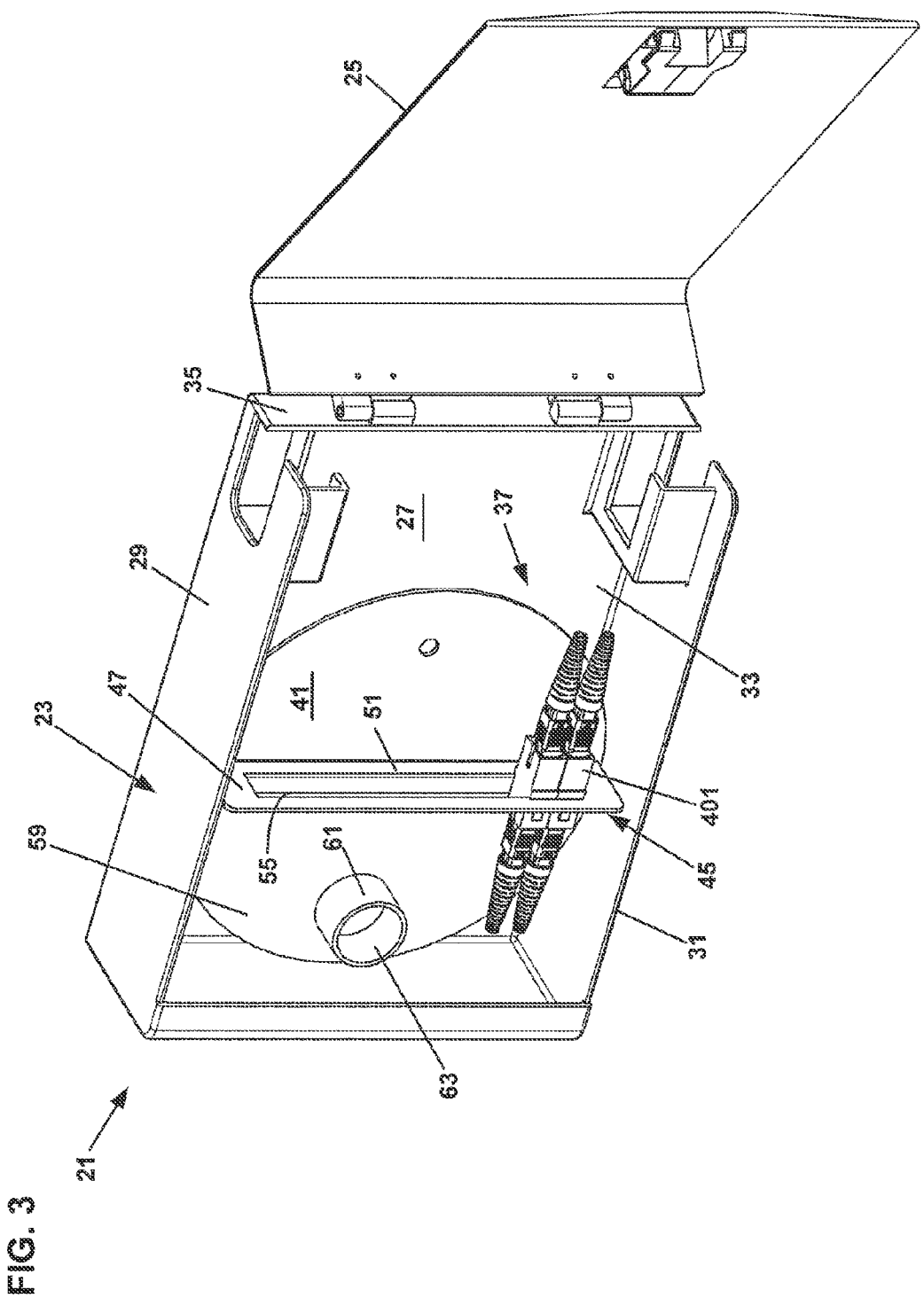
FIG. 3 is an isometric view of the fiber optic enclosure of FIG. 2 with a cover in an open position.
Figure 4:
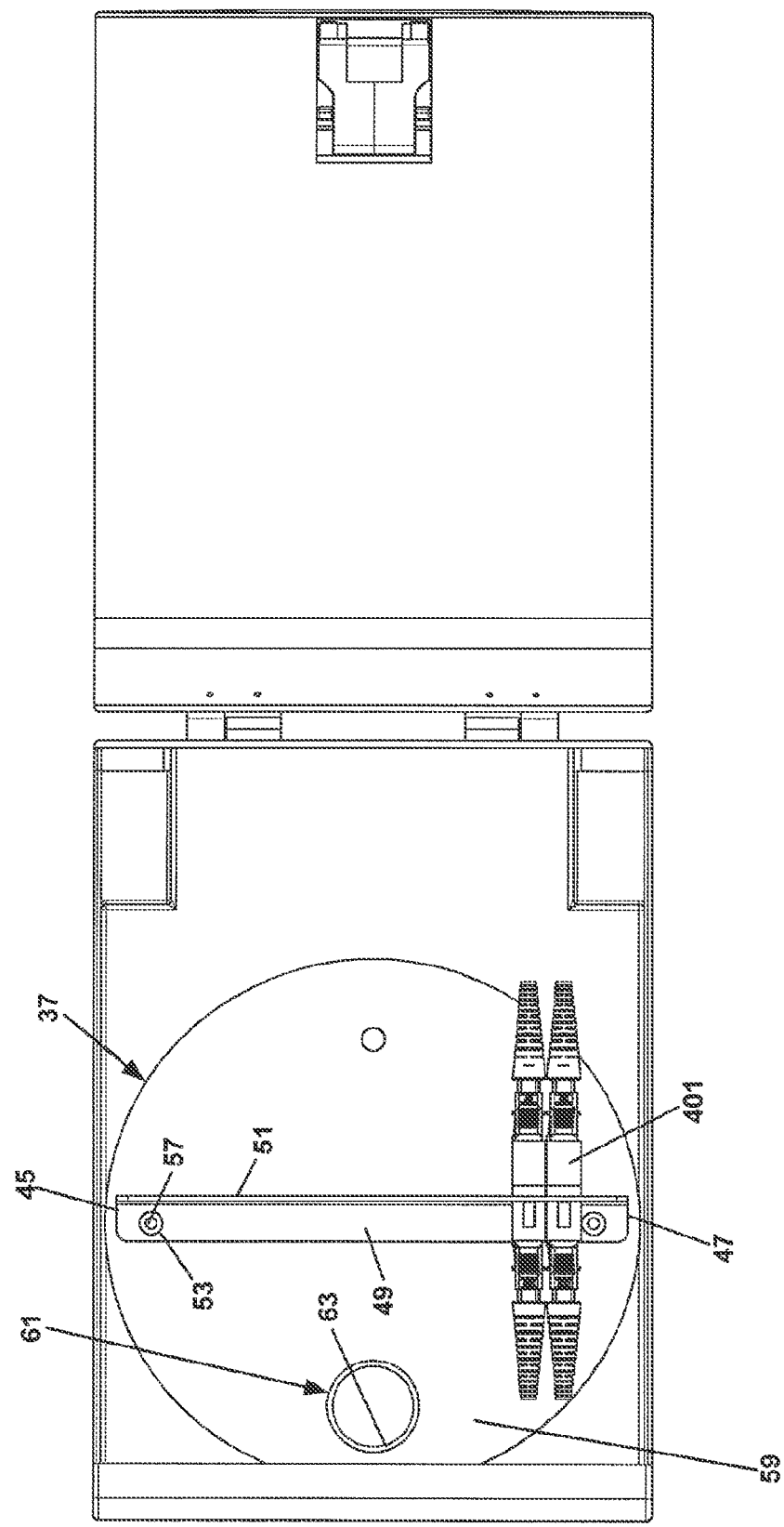
FIG. 4 is a front view of the fiber optic enclosure of FIG. 2 with the cover in the open position.

Referring now to FIGS. 3-5, the axial end 41 of the cable spool 37 further defines a slack storage area 59. The slack storage area 59 includes a cable management spool 61 disposed on the axial end 41 of the cable spool 37. The cable management spool 61 is sized such that an outer radius of the cable management spool 61 is larger than the minimum bend radius of the optical fibers so as to avoid attenuation damage to the optical fibers during storage.

The cable management spool 61 and the axial end 41 of the cable spool 37 cooperatively define a cable passage 63 that extends axially through the cable management spool 61 and through the axial end 41 of the cable spool 37. The cable passage 63 allows connectorized ends of incoming optical fibers to pass from the spooling portion 39 of the cable spool 37 to the slack storage area 59. The connectorized ends of the incoming optical fibers are then routed from the slack storage area 59 to the front sides 413 of the adapters 401 in the termination area 43.

Referring now to FIG. 5, the fiber optic enclosure 21 further includes a bearing mount, generally designated 71. In the subject embodiment, the bearing mount 71 is disposed on the base 27 of the housing 23. An outer surface 73 of the bearing mount 71 is adapted for a bearing 75 (shown as cross-hatching). In the subject embodiment, the bearing 75 is a needle bearing. However, it will be understood that the scope of the present disclosure is not limited to the bearing 75 being a needle bearing as the bearing 75 could also include a bushing, low-friction coating, etc.

In one embodiment, the bearing 75 is engaged with an inner diameter of a central hole of the cable spool 37. In another embodiment, a rotary plain bearing is formed between the outer surface 73 of the bearing mount 71 and the inner diameter of the central hole of the cable spool 37. In this embodiment, the outer diameter of the bearing mount 71 is sized to fit within an inner diameter of a central hole of the spooling portion 39. The engagement of the bearing mount 71 and the spooling portion 39 of the cable spool 37 allows the cable spool 37 to rotate about the central axis 77 of the bearing mount 71.

Referring now to FIGS. 1 and 5, the subscriber cable 22, which includes multiple optical fibers, is coiled around the spooling portion 39 of the cable spool 37. In order to protect the subscriber cable 22 from attenuation resulting from the coiling of the subscriber cable 22 around the spooling portion 39, the cable spool 37 has an outer circumferential surface having a radius that is greater than the minimum bend radius of the subscriber cable 22. The subscriber cable 22 includes a first end having connectorized ends, which are inserted through the cable passage 63 and connectedly engaged with the first ends 413 of the adapters 401. A second end of the subscriber cable 22 is configured for connectivity with the fiber distribution hub 17. However, as shown in FIG. 1, the length of subscriber cable 22 needed between each of the fiber optic enclosures 21 in the facility 13 and the fiber distribution hub 17 will vary depending upon the location of each fiber optic enclosure 21 with respect to the fiber distribution hub 17.

A method of installing and using the fiber optic enclosure 21 to account for the varying lengths of subscriber cable 22 needed between the fiber optic enclosure 21 and the fiber distribution hub 17 will now be described. The fiber optic enclosure 21 provides dual functionality by serving as a storage location for the subscriber cable 22 and by selectively paying out a desired length of the subscriber cable 22.

A first length of subscriber cable 22 is stored in the fiber optic enclosure 21 by coiling the length of subscriber cable 22 around the cable spool 37. The first length of subscriber cable 22 includes an installation length, which is sufficiently long to extend from the mounting location of the enclosure 28 to the fiber distribution hub 17, and an excess length, which is the length of subscriber cable 22 remaining on the cable spool 37 after the installation length has been paid out. In one embodiment, the first length is greater than or equal to about 100 feet. In another embodiment, the first length of subscriber cable 22 is greater than or equal to about 200 feet. In another embodiment, the first length of subscriber cable 22 is greater than or equal to about 300 feet. In another embodiment, the first length of subscriber cable 22 is greater than or equal to about 400 feet. In another embodiment, the first length of subscriber cable 22 is greater than or equal to about 500 feet. In another embodiment, the first length of subscriber cable 22 is in the range of about 100 to about 2,000 feet. In another embodiment, the first length of subscriber cable 22 is in the range of about 100 to about 1,500 feet. In another embodiment, the first length of subscriber cable 22 is in the range of about 500 to about 1,500 feet. In a preferred embodiment, the first length of subscriber cable 22, which is coiled around the cable spool 89, is in the range of 100 to 500 feet.

In one embodiment, a second length, or the excess length, of subscriber cable 22 is stored around the cable spool 37 after the first length of subscriber cable 22 has been paid out. If the first length of subscriber cable 22 is greater than the installation length of subscriber cable 22, the second length, or excess length, is stored around the cable spool 37.

The second function of the fiber optic enclosure 21 involves the selective payout of the subscriber cable 22. With the cable spool 37 mounted to the bearing mount 71, the first end of the subscriber cable 22 in connected engagement with the front sides 413 of the adapters 401 and the outgoing optical fibers disengaged from the back sides of the adapters 401, the subscriber cable 22 can be paid out through fiber ports 79 disposed in the first and second sidewalls 29, 31. The subscriber cable 22 is paid out of the fiber optic enclosure 21 by selectively rotating the cable spool 37 with respect to the housing 23 about the central axis 77 of the bearing mount 71. As the termination module 45 is disposed on the axial end 41 of the cable spool 37, the selective rotation of the cable spool 37 with respect to the housing 23 results in the selective rotation of the termination module 45. Since the termination module 45 rotates unitarily with or in unison with the cable spool 37, the second end of the subscriber cable 22 can be paid out without the first end of the subscriber cable 22 being pulled out of the termination module 45.

Once the desired length of subscriber cable 22 has been paid out, the rotation of the cable spool 37 is ceased. At this point, the position of the cable spool 37 can be fixed such that it does not rotate relative to the housing 23. In one embodiment, a pin is inserted through an opening in the axial end 41 of the cable spool 37 and through a corresponding opening in the base 27 of the housing 23 to fix the position of the cable spool 37 with respect to the housing 23. It will be understood, however, that the scope of the present disclosure is not limited to the use of a pin to fix the position of the cable spool 37 with respect to housing 23.

An alternate method of selectively paying-out subscriber cable 22 from the fiber optic enclosure 21 will now be described. With the fiber optic enclosure 21 positioned near the fiber distribution hub 17, the second end of the subscriber cable 22 is unwound from the cable spool 37. In one embodiment, the second end is optically connected to the fiber distribution hub 17. With the second end of the subscriber cable 22 optically connected to the fiber distribution hub 17 and the first end of the subscriber cable 22 in connected engagement with the termination module 45, the fiber optic enclosure 21 is transported away from the fiber distribution hub 17. In one embodiment, the fiber optic enclosure 21 is carried away from the fiber distribution hub 17 by an installer. In another embodiment, the fiber optic enclosure 21 is transported away from the fiber distribution hub 17 in a wheeled cart (e.g., dolly, 4-wheeled cart, etc.). In a preferred embodiment, the fiber optic enclosure is disposed in a packaging enclosure (e.g., a box) during transport. As the fiber optic enclosure 21 is transported away from the fiber distribution hub 17, the subscriber cable 22 unwinds from the cable spool 37 causing the cable spool 37 to rotate within the interior region 33 of the housing 23, which is disposed in the packaging enclosure. When the fiber optic enclosure 21 has been transported to its mounting location, the fiber optic enclosure 21 is removed from the packaging enclosure, mounted to the mounting location. The cable spool 37 can be fixed in position relative to the housing 23 to prevent inadvertent rotation of the cable spool 37.

Referring now to FIGS. 8-18, an alternate embodiment of a fiber optic enclosure 121 is shown. The fiber optic enclosure 121 includes a housing 123 and a hinged cover 125.

The housing 123 includes a base wall 120, a first sidewall 127 and an oppositely disposed second sidewall 128. The first and second sidewalls 127, 128 extend outwardly from the base wall 120 such that the base wall 120 and the first and second sidewalls 127, 128 cooperatively define an interior region 130.

In the subject embodiment, the first sidewall 127 of the housing 123 defines a first port 131 while the second sidewall 128 defines a second port 132. The subscriber cable 122 enters/exits the fiber optic enclosure 121 at the first port 131 or at the second port 132. In the subject embodiment, both of the first and second ports 131, 132 are provided as knockout portions.

A cable spool 137 is positioned within the interior region 130 of enclosure 121. In the subject embodiment, the cable spool 137 is adapted for rotation within the interior region 130 of the enclosure 121. In the subject embodiment, the cable spool 137 includes a first axial end 136, an oppositely disposed second axial end 138 and a spool portion 139. The spool portion 139 is disposed between the first and second axial ends 136, 138 of the cable spool 137. The spool portion 139 is adapted to receive a subscriber cable 122 coiled around or spooled on the spool portion 139.

With the subscriber cable 122 spooled on the spool portion 139, the subscriber cable 122 can be selectively paid out by rotating the cable spool 137. As the cable spool 137 is rotated, the subscriber cable 122 is unwound from the spool portion 139 of the cable spool 137. After a desired length of subscriber cable 122 has been paid out, pin openings 141 can be used with a pin to fix the position of cable spool 137 relative to housing 123.

The subscriber cable 122 is shown with a connectorized end 144 (e.g., MTP connector) for connecting to the fiber distribution hub 17 or other equipment. An opposite end of the subscriber cable 122 passes through an opening 145 disposed in the first axial end 136 of the cable spool 137. After passing through the opening 145, the subscriber cable 122 is routed to a fanout 147 disposed on the first axial end 136 of the cable spool 137 where the cable is broken out into individual fibers 124 having connectorized ends 146 (e.g., SC connectors).

A cable management spool 161 is also disposed on the first axial end 136 of the cable spool 137. The cable management spool 161 manages fibers 124. In the subject embodiment, the cable management spool 161 includes a plurality of fingers 162 disposed on an end of the cable management spool 161. The fingers 162 assist with cable retention.

The first axial end 136 of the cable spool 137 further includes an outer guide wall 163. In the subject embodiment, the outer guide wall 163 is disposed at a portion of the peripheral edge of the first axial end 136 adjacent to the cable management spool 161. In the subject embodiment, the outer guide wall 163 extends outwardly in a direction that is generally perpendicular to the first axial end 136.

The outer guide wall 163 includes with a cable finger 164 disposed at an end of the outer guide wall 163 that is opposite the end engaged with the first axial end 136 of the cable spool 137. The cable finger 164 assists with retention and protection of the fibers 124.

An adapter plate 149 is disposed on the first axial end 136 of the cable spool 137. In the subject embodiment, the adapter plate 149 includes separate openings 151. Each of the separate openings 151 is adapted to receive two adapters 401.

Figure 16:
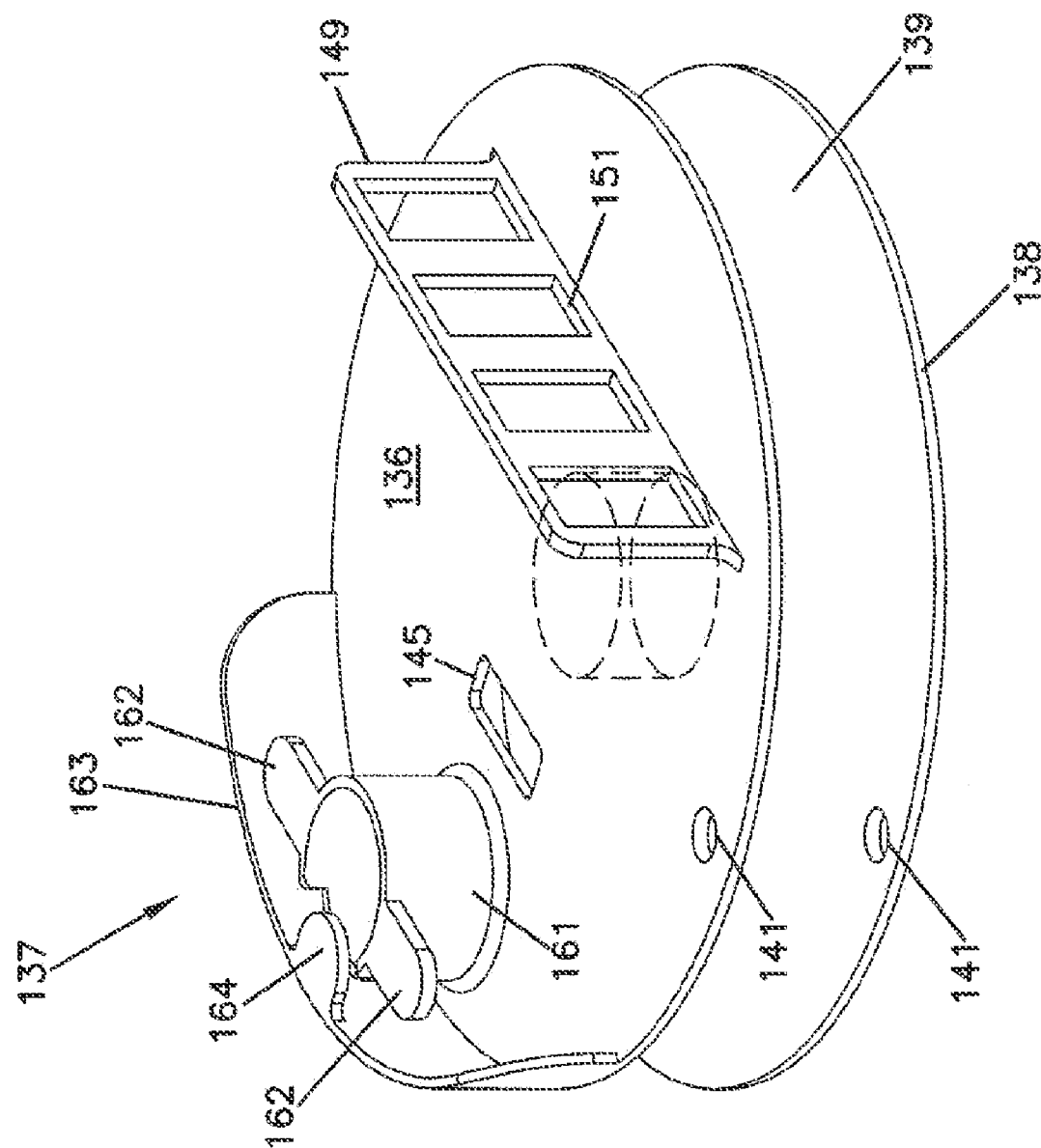
FIG. 16 is an isometric view of the cable spool of the fiber optic enclosure of FIG. 13.

In the depicted embodiment of FIG. 16, the cable management spool 161, the outer guide wall 163 and the adapter plate 149 are integrally formed with the first axial end 136 of the cable spool 137. In the subject embodiment, the first axial end 136 of the cable spool 137 is formed from plastic. In another embodiment, the first and second axial ends 136, 138, the spool portion 139, the adapter plate 149, the cable management spool 161 and the outer guide wall 163 are integrally formed from a plastic material.

Figure 13:
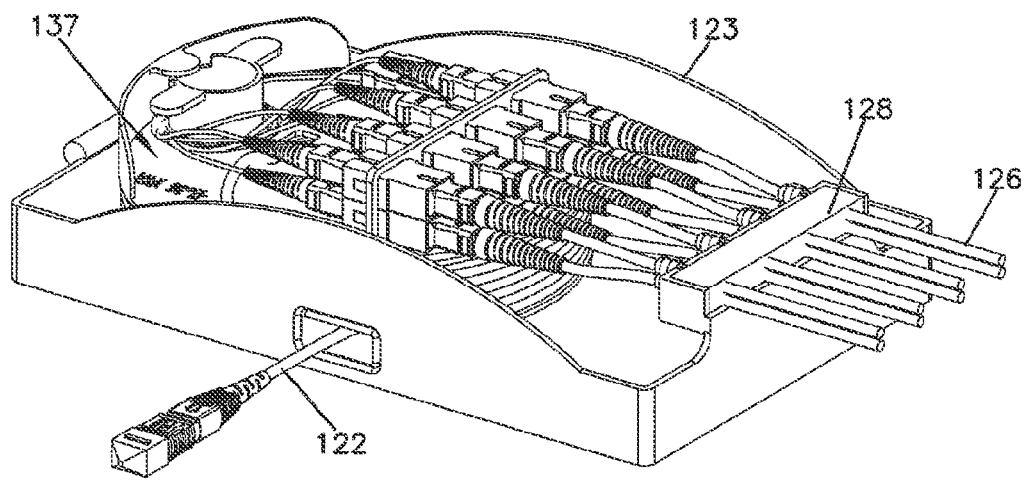
FIG. 13 is an isometric view of the fiber optic enclosure of FIG. 12 without the cover.
Figure 14:
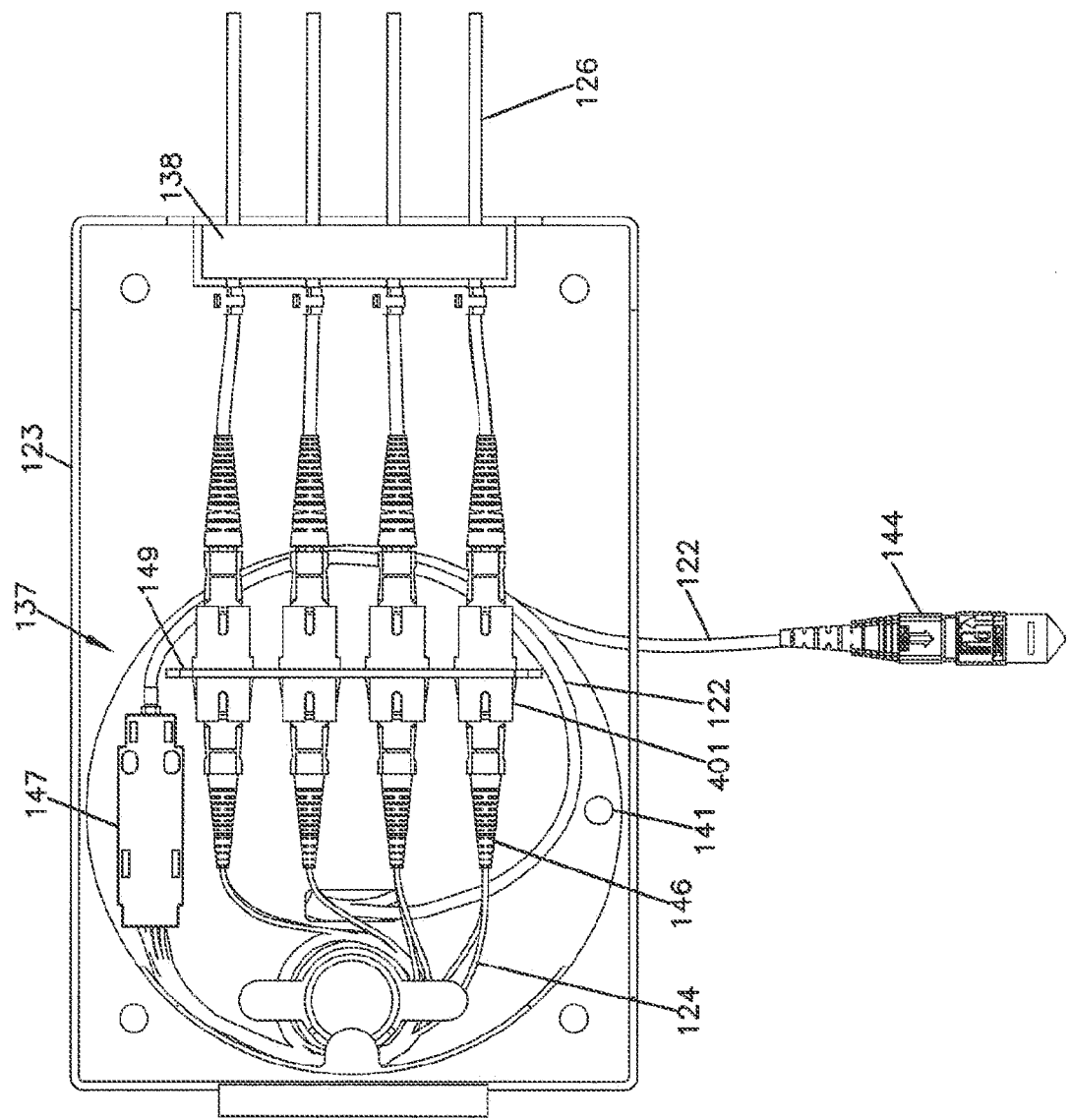
FIG. 14 is a front view of the fiber optic enclosure of FIG. 13.
Figure 15:
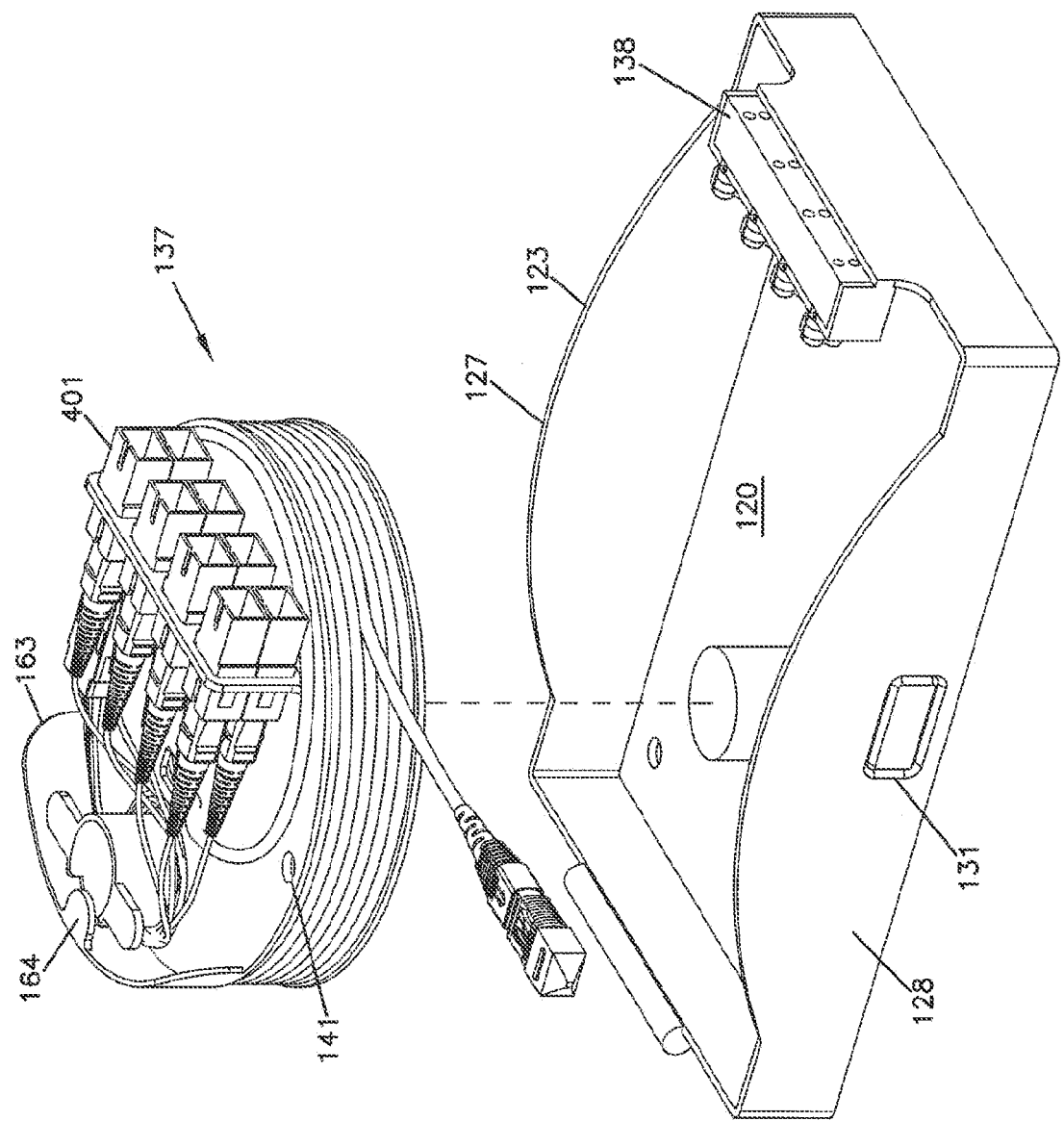
FIG. 15 is an exploded isometric view of the fiber optic enclosure of FIG. 13.

Referring now to FIGS. 13 and 14, the fiber optic enclosure 121 is shown connected to a second subscriber cable 126. After the subscriber cable 122 is paid out and cable spool 137 fixed in position relative to the housing 123, individual connectorized ends of the second subscriber cables 126 can be connected to the fibers 124 at adapters 401 of adapter plate 149. The second subscriber cables 126 exit the fiber optic enclosure 121 at a port 136 in a side 165 of the housing 123. In the illustrated embodiment, a slotted foam member 138 is disposed in the port 136. The slotted foam member 138 includes a plurality of slots through which the second subscriber cables 126 can be inserted in order to prevent or reduce the risk of ingress of environmental contamination (e.g., dust, water, etc.).

Figure 17:
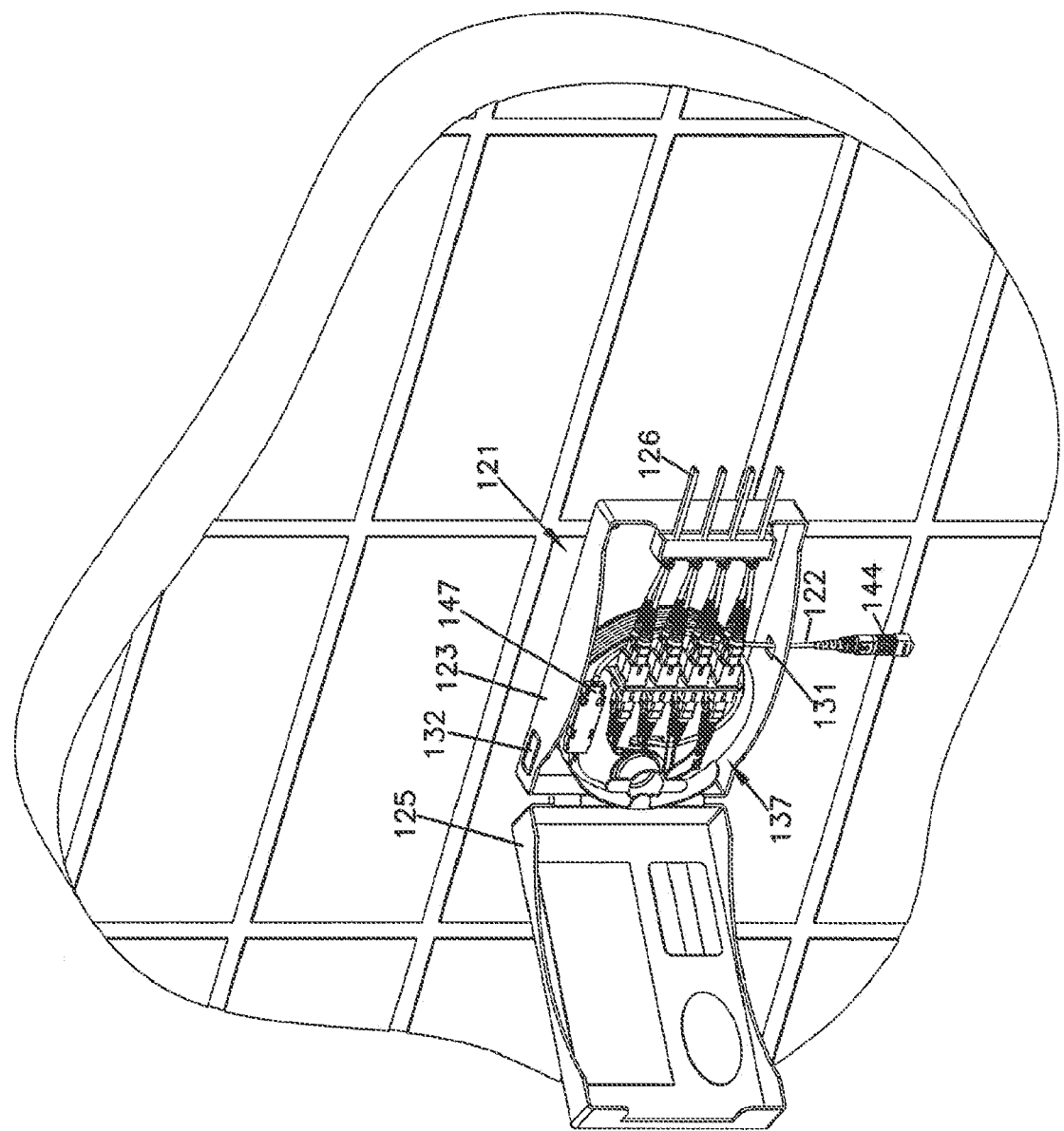
FIG. 17 is a further isometric view of the fiber optic enclosure of FIG. 12, with the cover in the pivoted open position.
Figure 18:
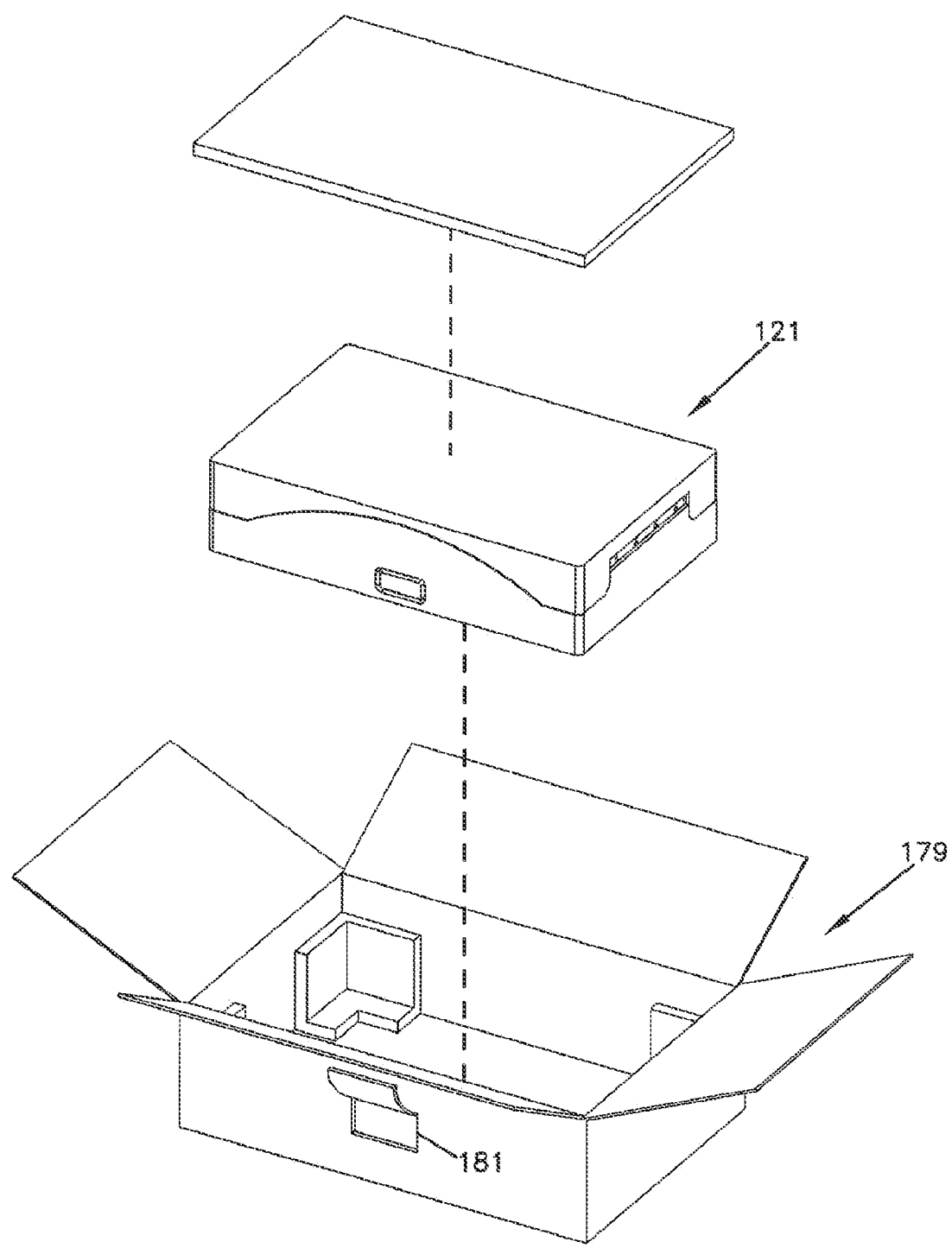
FIG. 18 is an exploded view of a shipping container in which is disposed the fiber optic enclosure of FIG. 8.

While the fiber optic enclosure 121 is shown mounted to a mounting location 183 (e.g., wall, pole, etc.) in FIGS. 1 and 17, it will be understood that the subscriber cable 122 can be paid out from the fiber optic enclosure 121 while the fiber optic enclosure 121 is either mounted to a mounting location 183 or removed from the mounting location 183. As shown in FIG. 18, the subscriber cable 122 could be paid out while the fiber optic enclosure 121 is still packaged in a shipping container 179 provided there is an opening 181 in the shipping container 179 through which the subscriber cable 122 can be pulled. After the subscriber cable 122 has been paid out, the fiber optic enclosure 121 can be removed from the shipping container 179 and mounted to the mounting location 183.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A fiber optic enclosure assembly for enclosing optical fiber connections, the fiber optic enclosure assembly comprising:
    a housing having an interior;
    a fiber optic cable including a plurality of optical fibers, the fiber optic cable including a first portion in which the optical fibers are collectively contained within a jacket and a second portion in which the optical fibers are broken out into individual optical fibers having connectorized ends, the first portion of the fiber optic cable being capable of being paid out from the interior of the housing;
    a cable storage spool about which the first portion of the fiber optic cable is wrapped, the cable storage spool being positioned within the interior of the housing, wherein the cable storage spool rotates about an axis to allow the first portion of the fiber optic cable to be paid out from the interior of the housing;
    a cable management spool about which the second portion of the first optic cable is wrapped; and
    a plurality of fiber optic adapters that receive the connectorized ends of the individual optical fibers, wherein the cable management spool and the plurality of fiber optic adapters are carried with the cable storage spool as the cable storage spool is rotated about the axis to allow the first portion of the fiber optic cable to be paid out from the interior of the housing.

2. The fiber optic enclosure assembly of claim 1, wherein the connectorized ends of the individual optical fibers are located at a first end of the fiber optic cable and a multi-fiber connector is mounted at a second end of the fiber optic cable.

3. The fiber optic enclosure of claim 1, wherein the fiber optic adapters include sliding adapter packs.

4. The fiber optic enclosure of claim 1, wherein the housing includes a main body defining a front opening, and a movable front cover for selectively covering and uncovering the front opening.

5. The fiber optic enclosure of claim 4, wherein the main body of the housing is adapted to be connected to a wall.

6. The fiber optic enclosure of claim 5, wherein the cable management spool is positioned in front of the cable storage spool.

7. The fiber optic enclosure of claim 1, further comprising subscriber optical fibers routed to subscriber locations, the subscriber fibers also being routed inside the interior of the housing, the subscriber fibers having connectorized ends that are inserted in the fiber optic adapters such that the subscriber optical fibers are optically connected to the optical fibers of the fiber optic cable.

8. A fiber optic enclosure assembly for enclosing fiber optic connections, the fiber optic enclosure assembly comprising:
    a housing defining an interior;
    a first spool positioned within the interior of the housing, the first spool defining a first storage space at which a fiber optic cable can be spooled, the first spool being rotatable within the interior of the housing about an axis of rotation;
    a second spool positioned within the interior of the housing, the second spool defining a second storage space at which a fiber optic cable can be spooled, the first storage space being separated from the second storage space by at least one spool flange;
    a plurality of fiber optic adapters positioned within the interior of the housing;
    wherein the plurality of fiber optic adapters and the second spool rotate in unison with the first spool when the first spool is rotated about the axis of rotation.

9. The fiber optic enclosure of claim 8, wherein the fiber optic adapters include sliding adapter packs.

10. The fiber optic enclosure of claim 8, wherein the housing includes a main body defining a front opening, and a movable front cover for selectively covering and uncovering the front opening.

11. The fiber optic enclosure of claim 10, wherein the main body of the housing is adapted to be connected to a wall.

12. The fiber optic enclosure of claim 11, wherein the second spool is positioned in front of the first spool.

13. A fiber optic enclosure assembly for enclosing fiber optic connections, the fiber optic enclosure assembly comprising:
    a housing defining an interior;

a fiber optic cable including a plurality of optical fibers, the fiber optic cable including a first portion in which the optical fibers are collectively contained within a jacket and a second portion in which the optical fibers are broken out into individual optical fibers having connectorized ends, the first portion of the fiber optic cable being capable of being paid out from the interior of the housing;

a cable management and connection assembly including
    a first spooling location at which the first portion of the fiber optic cable is coiled;
    a second spooling location separate from the first spooling location, the second portion of the fiber optic cable being coiled at the second spooling location; and
    a plurality of fiber optic adapters that receive the connectorized ends of the individual optical fibers;

wherein an entirety of the cable management and connection assembly is positioned within the interior of the housing, and wherein the entirety of the cable management and connection assembly rotates about an axis of rotation to allow the first portion of the fiber optic cable to be paid out from the interior of the housing.

14. The fiber optic enclosure assembly 13, wherein the connectorized ends of the individual optical fibers are located at a first end of the fiber optic cable and a multi-fiber connector is mounted at a second end of the fiber optic cable.

15. The fiber optic enclosure of claim 13, wherein the fiber optic adapters include sliding adapter packs.

16. The fiber optic enclosure of claim 13, wherein the housing includes a main body defining a front opening, and a movable front cover for selectively covering and uncovering the front opening.

17. The fiber optic enclosure of claim 16, wherein the main body of the housing is adapted to be connected to a wall.

18. The fiber optic enclosure of claim 17, wherein the second spooling location is positioned in front of the first spooling location.

19. The fiber optic enclosure of claim 13, further comprising subscriber optical fibers routed to subscriber locations, the subscriber fibers also being routed inside the interior of the housing, the subscriber fibers having connectorized ends that are inserted in the fiber optic adapters such that the subscriber optical fibers are optically connected to the optical fibers of the fiber optic cable.

* * * * *